United States Patent
Sato et al.

(10) Patent No.: US 6,958,100 B2
(45) Date of Patent: Oct. 25, 2005

(54) GAS-GENERATING AGENT COMPOSITION AND GAS GENERATOR EMPLOYING THE SAME

(75) Inventors: Eishi Sato, Hyogo (JP); Dairi Kubo, Hyogo (JP); Kenjiro Ikeda, Hyogo (JP)

(73) Assignee: Nippon Kayaku Kabushiki-Kaisha, Tokyo (JP)

( * ) Notice: Subject to any disclaimer, the term of this patent is extended or adjusted under 35 U.S.C. 154(b) by 0 days.

(21) Appl. No.: 10/398,215

(22) PCT Filed: Oct. 5, 2001

(86) PCT No.: PCT/JP01/08780

§ 371 (c)(1),
(2), (4) Date: Apr. 9, 2003

(87) PCT Pub. No.: WO02/30850

PCT Pub. Date: Apr. 18, 2002

(65) Prior Publication Data

US 2004/0000362 A1 Jan. 1, 2004

(30) Foreign Application Priority Data

Oct. 10, 2000 (JP) ........................................ 2000-308685
Sep. 19, 2001 (JP) ........................................ 2001-284371

(51) Int. Cl.$^7$ .......................... C06B 31/00; C06B 31/28
(52) U.S. Cl. ........................................... 149/45; 149/46
(58) Field of Search ............................... 149/45, 46, 61

(56) References Cited

U.S. PATENT DOCUMENTS

| | | | | |
|---|---|---|---|---|
| 5,608,183 A | * | 3/1997 | Barnes et al. .................. | 149/45 |
| 5,641,938 A | * | 6/1997 | Holland et al. ................ | 149/48 |
| 5,841,065 A | * | 11/1998 | Mendenhall .................. | 149/37 |
| 6,033,500 A | | 3/2000 | Ito et al. | |
| 6,132,537 A | * | 10/2000 | Zeuner et al. ................. | 149/45 |
| 6,416,599 B1 | | 7/2002 | Yoshikawa et al. | |
| 6,562,087 B1 | | 5/2003 | Kodama et al. | |

FOREIGN PATENT DOCUMENTS

| | | |
|---|---|---|
| JP | 10-259085 | 9/1998 |
| JP | 10-297991 | 11/1998 |
| WO | WO 02/085817 | 10/2002 |

OTHER PUBLICATIONS

U.S. Appl. No. 10/398,215, filed Apr. 9, 2003, Sato et al.
U.S. Appl. No. 10/679,384, filed Oct. 7, 2003, Sato et al.
U.S. Appl. No. 09/623,043, filed Aug. 25, 2000, Sato et al.
U.S. Appl. No. 10/018,856, filed Dec. 26, 2001, Kubo et al.
U.S. Appl. No. 10/398,215, filed Apr. 9, 2003, Sato et al.

\* cited by examiner

*Primary Examiner*—Aileen Felton
(74) *Attorney, Agent, or Firm*—Oblon, Spivak, McClelland, Maier & Neustadt, P.C.

(57) ABSTRACT

The present invention provides a gas generant composition comprising a nitrogen-containing organic compound, an oxidizing agent and an additive, wherein a calorific value per mol of gas generated by the combustion of the gas generant is not more than 125 KJ. Also, the present invention provides a gas generator using the said gas generant composition of the present invention.

In the gas generant composition that burns at a suitable combustion speed for the gas generator, a calorific value per mol of gas generated by the combustion of the gas generant is suppressed to a specific value as noted above, whereby reduction in size and weight of the gas generator is achieved.

25 Claims, No Drawings

GAS-GENERATING AGENT COMPOSITION AND GAS GENERATOR EMPLOYING THE SAME

TECHNICAL FIELD

The present invention relates to a gas generant composition. More particularly, the present invention relates to a gas generant composition suitable for a compact, lightweight, gas generator and to a gas generator using this gas generant composition.

BACKGROUND ART

In general, the gas generating composition used for a vehicle airbag system comprises a fuel containing sodium azide as a base and an oxidizing agent. However, in view of toxicity of sodium azide and restrictions on the handling, various attempts have been made to find alternative to the mixture used for preparation of the sodium-azide-containing gas generant so far.

U.S. Pat. No. 5,783,773 discloses a composition comprising phase stabilized ammonium nitrate as an oxidizing agent, and triaminoguanidinenitrate (hereinafter it is abbreviated to "TAGN") or combination of TAGN/guanidinenitrate as a fuel component. Further, U.S. Pat. No. 5,780,768 discloses a composition comprising guanidinenitrate/nitroguanidine as a fuel component and perchlorate as a base agent of the oxidizing agent. Both of the compositions are basically intended to obtain an adequate combustion speed by combining a high reactive component, such as TAGN and perchlorate, with a low reactive oxidizing agent and fuel. However, at the same time as the increase of the combustion speed, the calorific value increases also. In view of this, those gas generant compositions cannot be said to be suitable for the gas generator.

Japanese Patent Laid-open (Unexamined) Publication No. 2000-86375 discloses a combination of a fuel selected from compounds containing not less than 25% oxygen atom in a molecule by atomic weight, and a metal oxide and a metal compound oxide. Although this composition is designed to lower a combustion temperature, since the metal oxide is used for the oxidizing agent, the number of moles per weight of gas generated is not of sufficiency. When that composition is attempted to acquire a required number of moles of gas generated for inflating an airbag, an amount of gas generant used increases and, as a result, the calorific value generated by the combustion of the gas generant increases. This means that the gas generator using the composition of this type requires a large amount of coolants, so that it is hard to realize reduction in size and weight of that gas generator.

It is an object of the present invention to provide a gas generant composition that allows reduction in size and weight of a gas generator and provide a gas generator using that gas generant composition.

DISCLOSURE OF THE INVENTION

The inventors have been devoted themselves to consider possible ways of solving the problem above and have discovered that the problem could be solved by setting a calorific value per mole of gas generated by combustion of the gas generant composition to be in a specific range. The present invention has been derived therefrom.

A gas generant composition of the present invention comprises a nitrogen-containing organic compound, an oxidizing agent and an additive, wherein a calorific value per mol of gas generated by combustion of the gas generant is not more than 125 KJ. Also, a gas generator of the present invention is a gas generator using the said gas generant composition of the present invention.

According to the present invention, in the gas generant composition that burns at a suitable combustion speed for the gas generator, a calorific value per mol of gas generated by the combustion of the gas generant is suppressed, whereby reduction in size and weight of the gas generator is achieved.

BEST MODE FOR CARRYING OUT THE INVENTION

In the following, the present invention will be described in detail.

A gas generant composition of the present invention comprises a nitrogen-containing organic compound, an oxidizing agent and an additive, wherein a calorific value per mole of gas generated by combustion of the gas generant is not more than 125 KJ. It is a very important factor for realization of reduction in size and weight of the gas generator to suppress the calorific value per mole of gas generated by the combustion of the gas generant. The gas generator using gas generant that generates a large calorific value requires a large amount of coolants, so that it is hard to realize reduction in size and weight of the gas generator. In view of this, the calorific value per mol of gas generated is preferably not more than 115 KJ, or further preferably not more than 105 KJ. The airbag is inflated in accordance with the number of moles of gas generated by the combustion of the gas generant packed in the gas generator and the temperature of the generated gas. Accordingly, a sufficient number of moles of gas generated and a low temperature of the generated gas are needed for protecting a vehicle occupant safely.

If the temperature of the generated gas is too low, a large number of moles of gas generated, i.e., a large amount of gas generant, will be needed for obtaining a required gas volume for inflating the airbag. If this is the case, then the intent of the present invention to provide a gas generant composition that allows reduction in size and weight of the gas generator may possibly be lost. For this reason, it is preferable that the lower limit of the calorific value per mol of gas generated is properly determined in accordance with the degree of reduction in size and weight of the gas generator needed. Preferably, the calorific value per mol of gas generated is not less than 73 KJ, preferably not less than 95 KJ. In other words, it can be said that it is most preferable for reduction of gas generant and coolant needed to minimum doze and resulting realization of reduction in size and weight of the gas generator that the calorific value per mol of gas generated is set to be in the range of 95 KJ to 105 KJ.

Also, it is preferable that the gas generant composition of the present invention is a composition wherein the number of moles per 100 g of gas generated is not less than 2.70 mol, preferably not less than 2.80 mol. When the number of moles per 100 g of gas generated is less than that, a quantity of gas generant used increases so that reduction in size and weight of the gas generator cannot be realized. Even when the number of moles per 100 g of gas generated is high, if the calorific value is high, then a large amount of coolants need be contained in the gas generator. On the other hand, even when the calorific value is low, if the number of moles per 100 g of gas generated is low, then a quantity of gas generant used increases eventually. Accordingly, in any of the cases, it will be hard to realize reduction in size and weight of the gas generator.

In the case of the number of moles per 100 g of gas generated being high, the calorific value per mol of gas generated can be suppressed even if a significantly high calorific value is presented. It is preferable, however, that the calorific value per gram of gas generant composition is not more than 4,500 J, preferably not more than 4,000 J, or further preferably not more than 3,300 J, in terms of heat resistance of the components of the gas generator in which the gas generant composition is used.

Also, the temperature of the generated gas must be lowered to a lowest possible temperature, in terms of damage of the airbag and burn injury of a vehicle occupant.

Thus, according to the present invention, an optimum combination of the features of "the calorific value per mol of gas generated", "the calorific value per gram of gas generant composition", and "the number of moles of gas generated per 100 g of gas generant composition" is properly determined in accordance with performances of the gas generator manufactured and place or location for the gas generator to be installed.

The numeric values of "the calorific value per mol of gas generated", "the calorific value per gram of gas generant composition", and "the number of moles of gas generated per 100 g of gas generant composition" can be measured in a conventional measuring method. In the case of oxygen balance of the gas generant composition being zero (i.e., in the case of complete combustion), those numeric values can be determined by the theoretical calculation. The calculation is made on condition that carbon atoms in the gas generant components form $CO_2$ and nitrogen atoms in the gas generant components form $N_2$. Also, $H_2O$, when produced, is taken as a gas in the calculation, because it is usually fed to the airbag in the form of gas (water vapour).

The nitrogen-containing organic compounds that may be used in the present invention are nitrogen-containing organic compounds generally usable as a fuel for the gas generant used for the airbag system, such as tetrazoles, and derivatives of guanidine. In the gas generant composition of the present invention, a nitrogen-containing organic compound content is preferably in the range of not less than 30 weight % to 70 weight %, preferably not less than 35 weight % to not more than 60 weight %, though it varies in dependence on kinds of oxidizing agent and additive used, and the oxygen balance. In order that the calorific value per mol of gas generated by the combustion of the gas generant composition is adjusted to not more than 125 KJ (preferably not more than 115 KJ) and also the number of moles of gas generated is adjusted to not less than 2.70 mol per 100 g of gas generated, it is preferable that the nitrogen-containing organic compound used is a material selected from the group consisting of guanidine carbonate, guanidine nitrate, aminoguanidine nitrate, and mixtures thereof. Guanidine nitrate is particularly preferable for the gas generant, in terms of its relatively low cost, melting point higher than 200° C., and high thermal stability and from the viewpoints of environmental resistance. Further, since these compounds contain oxygen atoms in the molecules and require a small amount of oxidizing agent for complete combustion, a high number of moles of gas generated can be anticipated. In addition, they have high-negative standard entropy of formation $\Delta_f$ and, as a result of this, a small amount of energy is discharged during the combustion of the gas generant composition, so that the combustion temperature is kept at a low temperature. Hence, those compounds can be said to be intended preferable fuels for suppressing the calorific value per mol of gas generated.

It is preferable that the nitrogen-containing organic compound has a 50% average particle diameter in the range of not less than 5 $\mu$m to not more than 80 $\mu$m, preferably not less than 10 $\mu$m to not more than 50 $\mu$m. This is because when the nitrogen-containing organic compound is too large in 50% average particle diameter, the strength reduces when shaped, while on the other hand, when it is too small, a considerable cost is required for the pulverization. It is to be noted that the term "50% average particle diameter" indicates 50% average particle diameter on a number-of-pieces basis.

The oxidizing agents that may be used in the present invention include those generally used for preparation of gas generant for airbag. In the gas generant composition of the present invention, an oxidizing agent content is preferably in the range of not less than 30 weight % to not more than 70 weight %, preferably not less than 35 weight % to not more than 60 weight %, through it varies in dependence on the kinds of nitrogen-containing organic fuel and additive used, the oxygen balance, etc. In order that the calorific value per mol of gas generated by the combustion of the gas generant composition is adjusted to not more than 125 KJ (preferably not more than 115 KJ) and also the number of moles of gas generated is adjusted to not less than 2.70 mol per 100 g of gas generated, it is preferable that at least one material selected from the group consisting of phase stabilized ammonium nitrate, ammonium perchlorate, basic metal nitrate, nitrate, perchlorate or chlorate of alkali metals, and nitrate, perchlorate or chlorate of alkaline earth metals is used as the oxidizing agent. It is particularly preferable to use the oxidizing agent prepared by mixing at least two materials selected from said group, in terms of easiness in adjustment of performance.

The basic metal nitrates that may be used include basic copper nitrate. The nitrates of alkali metals that may be used include sodium nitrate and potassium nitrate. The perchlorates of alkali metals that may be used, include sodium perchlorate and potassium perchlorate. The chlorates of alkali metals that may be used, include sodium chlorate and potassium chlorate. The nitrates of alkaline earth metals that may be used, include magnesium nitrate, calcium nitrate, barium nitrate and stronitium nitrate. The perchlorates of alkaline earth metals that may be used, include magnesium perchlorate, calcium perchlorate, barium perchlorate and strontium perchlorate. The chlorates of alkaline earth metals that may be used, include magnesium chlorate, calcium chlorate, barium chlorate and strontium chlorate.

As disclosed by U.S. Pat. No. 5,780,768, when perchlorate, which is used to provide enhanced combustion performance, the gas generant comes to contain a chlorine gas component, so that there is a fear that the gas generant contains a metal chloride component may be produced in the generated gas. Accordingly, it is preferable to use other oxidizing agents than perchlorate. The use of the other oxidizing agent than perchlorate or proper selection of the nitrogen-containing organic compound combined can allow the substantially same effect of the invention.

When a mixed oxidizing agent is used as the oxidizing agent, the mixed oxidizing agent preferably contains at least one material selected from the group consisting of strontium nitrate, basic copper nitrate, and phase stabilized ammonium nitrate, in order to exclude solid contents in the generated gas and enhance the combustion performance. Further, it is preferable to prepare a mixed oxidizing agent by using two or three materials selected from the group consisting of strontium nitrate, basic copper nitrate, and phase stabilized ammonium nitrate.

When strontium nitrate is used in portion of the mixed oxidizing agent, a further adequate combustion speed for the gas generant can be provided. Also, combustion residuals of the strontium nitrate cause a slag forming reaction with a silicon-containing compound and metal oxide, as mentioned later, resulting in products that can be easily filtered. Accordingly, solid components contained in the generated gas can be discharged.

Another mixed oxidizing agent comprising basic copper nitrate and at least one material selected from the group consisting of nitrate of alkali earth metal and phase stabilized ammonium nitrate is also preferable.

When the basic copper nitrate is used in portion of the mixed oxidizing agent, an ignition performance of the gas generant composition is improved. In general, the gas generant is ignited by an igniter and an enhancer. In the case of gas generant of low ignitionability, a large amount of enhances of high calorific value must be used, resulting in increase in total calorific value for the gas generator and failure of reduction in size and weight of the gas generator.

Further, although the combustion residuals produced during the combustion of the basic copper nitrate are in the form of a mist of melted $Cu_2O$(m.p.=1,232° C.) /Cu(m.p.=1,083° C.), since the basic copper nitrate is a compound having a high-melting point, the combustion residuals produced can be easily removed by a cooling member provided in the gas generator. In addition, those combustion residuals can be made to coexist in the slag forming reaction of strontium nitrate, for easier removal, as mentioned later. The mixed oxidizing agent is effective in this respect as well.

Also, the use of phase stabilized ammonium nitrate in portion of the mixed oxidizing agent is very useful. It has been found that the use of phase stabilized ammonium nitrate produces the result of increasing not only the number of moles of gas generated but also the combustion speed.

In the phase-stabilized-ammonium-nitrate-based mixed oxidizing agent, the combination with a component of high reactivity, such as TAGN disclosed by U.S. Pat. No. 5,783,773, involves a risk in the manufacturing process. For this reason, when phase stabilized ammonium nitrate is used, a nitrogen-containing organic compound other than TAGN should preferably be used. It should be added, however, that the effect of the present invention can fully be yielded in the combination of phase stabilized ammonium nitrate with TAGN as well. Also, safe gas generant compositions can be prepared in dependent upon other combination of oxidizing agent, nitrogen-containing organic compound and additive used.

No particular limitation is imposed on the phase stabilization method of the phase stabilized ammonium nitrate that may be used in the present invention. Adding potassium salt to ammonium nitrate can be cited as an example of the known phase stabilization method. Ammonium nitrate that is phase-stabilized by adding a small amount of potassium perchlorate, potassium nitrate, potassium chlorate, potassium nitrite, potassium sulfate, potassium chloride, and potassium oxalate to potassium nitrate is preferably used in the present invention. Ammonium nitrate that is phase-stabilized by potassium perchlorate or potassium nitrate is particularly preferable in terms of heat stability, oxidation ability, etc. An amount of the potassium salts added to ammonium nitrate is in the range of not less than 1 weight % to not more than 30 weight %, preferably not less than 1 weight % to not more than 15 weight %.

Metal complex, such as diamine complex, may also be used as the phase stabilizing agent. When diamine complex is used, copper, nickel, and zinc are preferably used as the metal component.

The content of phase stabilized ammonium nitrate used as the mixed oxidizing agent in the gas generant composition is preferably in the range of not less than 1 weight % to not more than 40 weight %, preferably not less than 1 weight % to not more than 30 weight %, though it varies in dependence on kinds of nitrogen-containing organic fuel and additive used, and the oxygen balance. When ammonium nitrate that is phase-stabilized by using potassium salt is used, potassium oxide, potassium carbonate or potassium chloride having a low melting point and a low boiling point are produced by the combustion of the gas generant. It is extremely hard to filter these compounds through filters in the gas generator, so that there is the possibility that those may flow out from the gas generator to cause the damage to the airbag or may scald the vehicle occupants. For this reason, it is preferable that the content of phase stabilized ammonium nitrate in the gas generant composition is designed to be in the range specified above.

Also, it is preferable that the oxidizing agent has a particle diameter in the range of not less than 5 $\mu$m to not more than 80 $\mu$m, preferably not less than 10 $\mu$m to not more than 50 $\mu$m, in terms of 50% particle diameter. This is because an excessively large particle diameter of the oxidizing agent causes reduction of strength of the gas generant when shaped, while on the other hand, an excessively small particle diameter of the oxidizing agent causes lost of costs for the pulverization.

The additives that may be used in the present invention include those generally available as the additives for the airbag gas generant. For example, the components to create ease of filtering of the combustion residuals (slag forming agent) and the binders to create environmental resistance can be cited as the additives. The content of additive in the gas generant composition is preferably in the range of not less than 1 weight % to not more than 15 weight %; preferably not less than 1 weight % to not more than 10 weight %.

The slag forming agents that may be used in the present invention include those generally available as the additives for the airbag gas generant. For example, silicon nitride, silicon carbide, and silicate can be cited as the additives. Silane compound is particular preferable for the present invention.

The silane compounds that may be preferably used as the slag forming agent in the present invention are organic silicon compounds. Particularly preferable are silicon compounds known as silane coupling agents, such as vinyl silane, epoxy silane, acryl silane, and amino silane. The content of silane compound in the gas generant composition of the present invention is preferably in the range of not less than 0.1 weight % to not more than 15 weight %, preferably not less than 0.5 weight % to not more than 10 weight %, or further preferably not less than 0.5 weight % to not more than 8 weight %. With the content of silane compound in excess of this range, the combustion temperature rises, so that there is the possibility that nitrogen oxides harmful to humans may be produced in the gas generated. Further, the calorific value of the gas generant increases, so that there is the possibility that the object of the present invention may not be achieved. It was found that when the gas generant composition contains the silane coupling agent, the combustion residues produced from the combustion reaction of strontium nitrate are converted into the compounds that can be easily filtered by the filters provided in the gas generator. It was also found that when the gas generant composition contains the silane coupling agent, the strength of the gas generant when shaped is enhanced and the combustion speed is increased.

The binders that may be used in the present invention include those generally available as the additives for the airbag gas generant. The binders used depend on the molding method. Synthetic hydrotalcite, acid clay, talc, bentonite, diatomite, molybdenum disulfide, crystalline cellulose, graphite, magnesium stearate, and calcium stearate can be cited as concrete examples of the binder used for a press-molding. Also, sodium salt of carboxymethylcellulose, methylcellulose, hydroxyethylcellulose, hydroxypropylcellulose, polyvinyl alcohol, guar gum, polyvinyl pyrrolidone, polyacrylamide or mixtures thereof can be cited as concrete examples of the binder for an extrusion molding. In the case of the extrusion molding, the binders cited above, and lubricants, including a detergent, a coupling agent, a graphite, and molybdenum disulfide, are added to the gas generant composition in the range of 0.5 weight % to 5 weight %, to improve moldability.

The content of binder in the gas generant composition is preferably in the range of not less than 0.1 weight % to not more than 15 weight %, preferably not less than 1.0 weight % to not more than 10 weight %. The content of the binder of more than the upper limit causes decrease in combustion speed and, in turn, reduction in number of moles of gas generated, so that there is the possibility that the airbag may fail to serve as its vehicle occupant protection system. On the other hand, the content of the binder of less than the lower limit may cause degradation in environmental resistance.

In addition, a combustion adjustor may be used as the additive in the present invention. Any combustion adjustors may be used, as long as they can serve to adjust the combustion of the gas generant. Specifically, metal oxides, such as iron oxide, nickel oxide, copper oxide, zinc oxide, manganese oxide, chromium oxide, cobalt oxide, molybdenum oxide, vanadium oxide and tungstic oxide, metal hydroxides, such as copper hydroxide, cobalt hydroxide, zinc hydroxide, and aluminum hydroxide, and carbons, such as powders of activated carbon, graphite and carbon black can be cited as the combustion adjustor. The content of combustion adjustor in the gas generant composition is preferably in the range of not less than 0 weight % to not more than 10 weight %, preferably not less than 0 weight % to not more than 5 weight %.

Next, certain concrete examples of preferable combinations of the gas generant composition of the present invention will be described. In the gas generant composition of the present invention, a preferable combination comprises guanidine nitrate used as the nitrogen-containing organic compound, and at least two materials selected from the group consisting of strontium nitrate, basic copper nitrate, and phase stabilized ammonium nitrate used as the oxidizing agent. To be more specific, the preferable combinations include the following.

Guanidine nitrate in the range of not less than 40 weight % to not more than 60 weight %; strontium nitrate in the range of not less than 15 weight %. to not more than 50 weight %; basic copper nitrate in the range of not less than 1 weight % to not more than 30 weight %; and additives of the rest of it (preferably in the range of not less than 0.5 weight % to not more than 10 weight %); and Guanidine nitrate in the range of not less than 40 weight % to not more than 60 weight %; strontium nitrate in the range of not less than 15 weight % to not more than 50 weight %; basic copper nitrate in the range of not less than 1 weight % to not more than 30 weight %; phase stabilized ammonium nitrate in the range of not less than 1 weight % to not more than 30 weight %; and additives of the rest of it (preferably in the range of not less than 0.5 weight % to not more than 10 weight %).

The additives that may be used singularly or in combination include combination of silane coupling agent and synthetic hydrotalcite; combination of a binder for extrusion molding and a lubricant, and acid clay. Concrete examples of the combinations using these additives include the following:

Guanidine nitrate in the range of not less than 40 weight % to not more than 60 weight %; strontium nitrate in the range of not less than 15 weight % to not more than 50 weight %; basic copper nitrate in the range of not less than 1 weight % to not more than 20 weight %; silane coupling agent in the range of not less than 0.5 weight % to not more than 10 weight %; and synthetic hydrotalcite in the range of not less than 0.5 weight % to not more than 10 weight %;

Guanidine nitrate in the range of not less than 40 weight % to not more than 60 weight %; strontium nitrate in the range of not less than 15 weight % to not more than 50 weight %; basic copper nitrate in the range of not less than 1 weight % to not more than 30 weight %; and acid clay in the range of not less than 0.5 weight % to not more than 10 weight %;

Guanidine nitrate in the range of not less than 40 weight % to not more than 60 weight %; strontium nitrate in the range of not less than 15 weight % to not more than 50 weight %; basic copper nitrate in the range of not less than 1 weight % to not more than 20 weight %; phase stabilized ammonium nitrate in the range of not less than 1 weight % to not more than 30 weight %; silane coupling agent in the range of not less than 0.5 weight % to more than 10 weight %; and synthetic hydrotalcite in the range of not less than 0.5 weight % to not more than 10 weight %;

Guanidine nitrate in the range of not less than 40 weight % to not more than 60 weight %; strontium nitrate in the range of not less than 15 weight % to not more than 50 weight %; basic copper nitrate in the range of not less than 1 weight % to not more than 30 weight %; binder for extrusion molding in the range of not less than 1 weight % to not more than 10 weight %; and lubricant in the range of not less than 0 weight % to not more than 5 weight %;

Guanidine nitrate in the range of not less than 40 weight % to not more than 60 weight %; strontium nitrate in the range of not less than 15 weight % to not more than 50 weight %; basic copper nitrate in the range of not less than 1 weight % to not more than 30 weight %; binder in the range of not less than 1 weight % to 10 weight %; acid clay in the range of not less than 1 weight % to 5 weight %; and graphite in the range of not less than 0.2 weight % to not more than 5 weight %.

Next, an example of the producing method of the gas generant composition of the present invention will be described. The nitrogen-containing organic compound, the oxidizing agent and the additives are mixed by use of a V-type blending machine or a ball mill, first. Then, an adequate amount of silane coupling agent is sprayed on the mixture and, further, water or a solvent is sprayed thereon under stirring, to form a wet cake. The silane coupling agent may alternatively be previously mixed in water or the solvent before being sprayed. The nitrogen-containing organic compound and oxidizing agent, and the silane coupling are then chemically bonded to each other, so that the both are bonded together with an increased bonding power. Thereafter, they are granulated and dried to obtain strong granulated powders. The granulated powders may be pelletized to form the gas generant pellets. Alternatively, the wet chemical clot itself may be extruded into an extruded molding by an extruder. In either case, the gas generant, after formed or molded, is dried at a temperature of approximately 105° C., to obtain a strong gas generant molding to withstand harsh environmental conditions.

No particular limitation is imposed on the form of the gas generant composition of the present invention molded. The gas generant composition may be formed into any forms, including a powdery form, a granular form, a spherical form, a columnar form, a single-hole cylinder form, and a multiple-hole cylinder form.

EXAMPLES

While in the following, the present invention will be described in further concrete with reference to Examples and Comparative Examples, the present invention is not limited to these Examples only.

Example 1

52.9 parts by weight of guanidine nitrate (20 μm in 50% particle diameter) as the component of nitrogen-containing organic compound, and 30.8 parts by weight of strontium nitrate (13 μm in 50% particle diameter) and 10.9 parts by weight of basic copper nitrate (10 μm in 50% particle diameter), both of which were the oxidizing agent components, and 2.7 parts by weight of synthetic hydrotalcite (10 μm in 50% particle diameter) as the binder were dry blended by use of the V-type blending machine. Then, 2.7 warts by weight of N-β-(aminoethyl)-γ-aminopropyltrimethoxy silane was diluted in 10 weight % of water to the total quantity of gas generant composition, first, and, then, the aqueous solution was sprayed on the mixed gas generant composition under stirring. Thereafter, the resulting gas generant composition was subjected to the wet granulation process to produce granulated powders of not more than 1 mm in particle diameter. After the granulated powders thus produced were dried at 90° C. for 15 hours, they were pressed into shapes by a rotary pelletizing machine to produce pellets of 5 mm in diameter and 1.5 mm in height. Thereafter, those pellets were dried at 105° C. for 15 hours, to obtain the pellets of the gas generant composition of the present invention.

The calorific values of the pellets thus obtained were measured with a calorimeter (Available from Shimadzu Corporation: Model No. CA-4P). The results are shown in TABLE 1, together with the calorific value per gram, the number of moles of gas generated, and the calorific value per mol.

Example 2

51.0 parts by weight of guanidine nitrate (20 μm in 50% particle diameter) as the component of nitrogen-containing organic compound, and 25.1 parts by weight of strontium nitrate (13 μm in 50% particle diameter) and 8.9 parts by weight of basic copper nitrate (10 μm in 50% particle diameter), both of which were the oxidizing agent components, 9.6 parts by weight of phase stabilized ammonium nitrate (which contains 15 weight % of potassium nitrate as the phase stabilizer), 2.7 parts by weight of synthetic hydrotalcite (10 μm in 50% particle diameter) as the binder, and 2.7 parts by weight of N-β-(aminoethyl)-γ-aminopropyltrimethoxy silane were used to prepare the gas generant composition molded in the same manner as in Example 1. Then, the calorific values were measured. The results are shown in TABLE 1, together with the calorific value per gram, the number of moles of gas generated, and the calorific value per mol.

Example 3

54.5 parts by weight of guanidine nitrate (20 μm in 50% particle diameter) as the component of nitrogen-containing organic compound, and 22.0 parts by weight of strontium nitrate (13 μm in 50% particle diameter) and 21.5 parts by weight of basic copper nitrate (10 μm in 50% particle diameter), both of which were the oxidizing agent components, and 2.0 parts by weight of acid clay as the binder were mixed and press-molded. Then, the gas generant composition moldings were prepared and the calorific values were measured. The results are shown in TABLE 1, together with the calorific value per gram, the number of moles of gas generated, and the calorific value per mol.

Example 4

52.7 parts by weight of guanidine nitrate (20 μm in 50% particle diameter) as the component of nitrogen-containing organic compound, and 22.4 parts by weight of strontium nitrate (13 μm in 50% particle diameter) and 21.9 parts by weight of basic copper nitrate (10 μm in 50% particle diameter), both of which were the oxidizing agent components, 2.0 parts by weight of acid clay as the binder, and 1.0 parts by weight of graphite as the combustion adjustor were mixed and press-molded. Then, the gas generant composition moldings were prepared and the calorific values were measured. The results are shown in TABLE 1, together with the calorific value per gram, the number of moles of gas generated, and the calorific value per mol.

Comparative Example 1

32.5 parts by weight of 5-aminotetrazole (15 μm in 50% particle diameter) as the component of nitrogen-containing organic compound, and 59.5 parts by weight of strontium nitrate (13 μm in 50% particle diameter) as the oxidizing agent, 3.5 parts by weight of silicon nitride (5 μm in 50% particle diameter) as the silane compound, and 4.5 parts by weight of synthetic hydrotalcite (10 μm in 50% particle diameter) as the binder were dry blended by use of the V-type blending machine. Thereafter, they were pressed into shapes by the rotary pelletizing machine to produce pellets of 5 mm in diameter and 2.2 mm in height. Thereafter, those pellets were dried at 105° C. for 15 hours, to prepare the pellets of the gas generant composition of the present invention. Then, the calorific values of the pellets thus obtained were measured. The results are shown in TABLE 1, together with the calorific value per gram, the number of moles of gas generated, and the calorific value per mol.

Comparative Example 2

50.7 parts by weight of nitroguanidine (15 μm in 50% particle diameter) as the component of nitrogen-containing organic compound, and 22.8 parts by weight of strontium nitrate (13 μm in 50% particle diameter) and 21.7 parts by weight of ammonium perchlorate (30 μm in 50% particle diameter), both of which were the oxidizing agent components, 1.5 parts by weight of silicon nitride (5 μm in 50% particle diameter) as the silane compound, and 3.3 parts by weight of synthetic hydrotalcite (10 μm in 50% particle diameter) as the binder were used to prepare the pellets of the gas generant composition in the same manner as in Comparative Example 1. Then, the calorific values were measured. The results are shown in TABLE 1, together with the calorific value per gram, the number of moles of gas generated, and the calorific value per mol.

Comparative Example 3

31.5 parts by weight of nitroguanidine (15 μm in 50% particle diameter) as the component of nitrogen-containing organic compound, and 51.5 parts by weight of strontium nitrate (13 μm in 50% particle diameter), 7.0 parts by weight of acid clay (5 μm in 50% particle diameter) as the binder, and 10 parts by weight of sodium salt of carboxymethyl cellulose as the binder were pulverized and mixed. Thereafter, 10 weight % of water was added to the gas generant composition and kneaded and then the kneaded gas generant was extruded to produce pellets of 2 mm in diameter and 2 mm in height. Thereafter, those pellets were dried at 105° C. for 15 hours, to obtain the test samples. Then, the calorific values of these test samples were measured in the same manner. The results are shown in TABLE 1, together with the calorific value per gram, the number of moles of gas generated, and the calorific value per mol.

TABLE 1

|  | Calorific value [J/g] | Number of moles of gas generated [Mol/100 g] | Calorific value per mol [KJ/Mol] |
| --- | --- | --- | --- |
| Example 1 | 3,020 | 3.11 | 97 |
| Example 2 | 3,270 | 3.31 | 99 |
| Example 3 | 2,940 | 2.96 | 99 |
| Example 4 | 2,970 | 2.96 | 100 |
| Compara. Ex. 1 | 3,200 | 2.29 | 140 |
| Compara. Ex. 2 | 4,650 | 3.60 | 129 |
| Compara. Ex. 3 | 3,500 | 2.42 | 145 |

[Test]

Then, with the gas generant composition of Example 2 of the present invention and the composition of Comparative Example 1 built in their respective gas generators, a closed 60-liter tank test was conducted. In this testing, the test quantity of the both gas generant compositions was adjusted so that the number of moles of gas generated can become 1 mol. The results were summarized in Table 2 given below.

TABLE 2

|  | Example 2 | Comparative Example 1 |
| --- | --- | --- |
| Quantity of gas generant used [g] | 30 | 43 |
| Weight of coolant used [g] | 70 | 140 |
| Tank pressure [KPa] | 167 | 175 |
| Maximum pressure arrival time [msec] | 76.2 | 75.4 |
| Tank temperature [° C.] | 222 | 247 |

(Note)
Material of coolant: SWM (JIS (Japanese Industrial Standards))

It will be appreciated from the results of TABLE 2 that suppose that the gas generator using the gas generant composition of Example 2 is made equal in output performance to the gas generator using the gas generant composition of Comparative Example 1, then the gas generator using the gas generant composition of the present invention will enable the quantity of gas genenrant used and the quantity of coolant used to be both reduced significantly. In other words, the gas generant composition of the present invention can be said to be a composition that enables the reduction in size and weight of the gas generator.

Capabilities of Exploitation in Industry

According to the gas generant composition of the present invention that burns at a suitable combustion speed for the gas generator, a calorific value per mol of gas generated by the combustion of the gas generant is suppressed, whereby reduction in size and weight of the gas generator is achieved.

Thus, the gas generant composition of the present invention is an optimum gas generant composition that can allow reduction in size and weight of the gas generator. Again, the gas generator using the gas generant composition of the present invention is an optimum gas generator for allowing reduction in size and weight of the gas generator.

What is claimed is:

1. A gas generant composition comprising a nitrogen-containing organic compound, an oxidizing agent and an additive, wherein a calorific value per mol of gas generated by combustion of the gas generant is not more than 125 KJ, and
   wherein the nitrogen-containing organic compound is selected from tetrazoles, guanidine, derivatives of guanidine, salts thereof, or mixtures thereof, and
   wherein the oxidizing agent is a mixed oxidizing agent comprising basic copper nitrate and at least one material selected from the group consisting of nitrate salt of alkaline earth metal and phased stabilized ammonium nitrate, and
   wherein the additive is selected from silicon nitride, silicon carbide, silicate, organic silicon compounds, binder compounds, lubricants, combustion adjusters, or mixtures thereof.

2. The gas generant composition according to claim 1, wherein the calorific value per mol of gas generated is not more than 115 KJ.

3. The gas generant composition according to claim 1, wherein the number of moles of gas generated by the combustion of the gas generant composition is not less than 2.70 per 100 g of the composition.

4. The gas generant composition according to claim 1, wherein a calorific value per gram of the gas generant composition is not more than 4,500 J.

5. The gas generant composition according to claim 1, wherein the nitrogen-containing organic compound is a material selected from the group consisting of guanidine carbonate, guanidine nitrate, aminoguanidine nitrate, and mixtures thereof.

6. The gas generant composition according to claim 1, wherein the mixed oxidizing agent comprises basic copper nitrate and at least strontium nitrate.

7. The gas generant composition according to claim 1, wherein the additive is a silane compound present in the range of not less than 0.1 weight % to not more than 15 weight %.

8. The gas generant composition according to claim 1, wherein the additive is a molding binder present in the range of not less than 0.1 weight % to not more than 15 weight %.

9. The gas generant composition according to claim 1, which comprises guanidine nitrate in the range of not less than 40 weight % to not more than 60 weight %, strontium nitrate in the range of not less than 15 weight % to not more than 50 weight %, basic copper nitrate in the range of not less than 1 weight % to not more than 30 weight %, and the additive in the range of not less than 0.5 weight % to not more than 10 weight %.

10. The gas generant composition according to claim 1, which comprises guanidine nitrate in the range of not less than 40 weight % to not more than 60 weight %, strontium nitrate in the range of not less than 15 weight % to not more than 50 weight %, basic copper nitrate in the range of not less than 1 weight % to not more than 30 weight %, phase stabilized ammonium nitrate in the range of not less than 1 weight % to not more than 30 weight %, and the additive in the range of not less than 0.5 weight % to not more than 10 weight %.

11. A gas generator device containing a gas generant, wherein the as generant comprises the gas generant composition according to claim 1.

12. A gas generator device containing a gas generant, wherein the gas generant comprises the gas generant composition according to claim 2.

13. A gas generator device containing a gas generant, wherein the gas generant comprises the gas generant composition according to claim 3.

14. A gas generator device containing a gas generant, wherein the gas generant comprises the gas generant composition according to claim 4.

15. A gas generator device containing a gas generant, wherein the gas generant comprises the gas generant composition according to claim 5.

16. A gas generator device containing a gas generant, wherein the gas generant comprises the gas generant composition according to claim 6.

17. A gas generator device containing a gas generant, wherein the gas generant comprises the gas generant composition according to claim 7.

18. A gas generator device containing a gas generant, wherein the gas generant comprises the gas generant composition according to claim 8.

19. A gas generator device containing a gas generant, wherein the gas generant comprises the gas generant composition according to claim 9.

20. A gas generator device containing a gas generant, wherein the gas generant comprises the gas generant composition according to claim 10.

21. The gas generant composition according to claim 1, wherein the nitrogen-containing organic compound is a material selected from the group consisting of guanidine carbonate, guanidine nitrate, aminoguanidine nitrate, and mixtures thereof, and wherein the mixed oxidizing agent comprises basic copper nitrate and at least strontium nitrate.

22. The gas generant composition according to claim 1, wherein the additive is selected from the group consisting of acid clay, graphite and mixtures thereof.

23. The gas generant composition according to claim 5, wherein the additive is selected from the group consisting of acid clay, graphite and mixtures thereof.

24. The gas generant composition according to claim 1, wherein the nitrogen-containing organic compound has a 50% average particle diameter in the range of 5 $\mu$m to 80 $\mu$m.

25. The gas generant composition according to claim 1, wherein the mixed oxidizing agent comprises basic copper nitrate, nitrate salt of alkaline earth metal and phased stabilized ammonium nitrate.

* * * * *